Patented Feb. 21, 1939

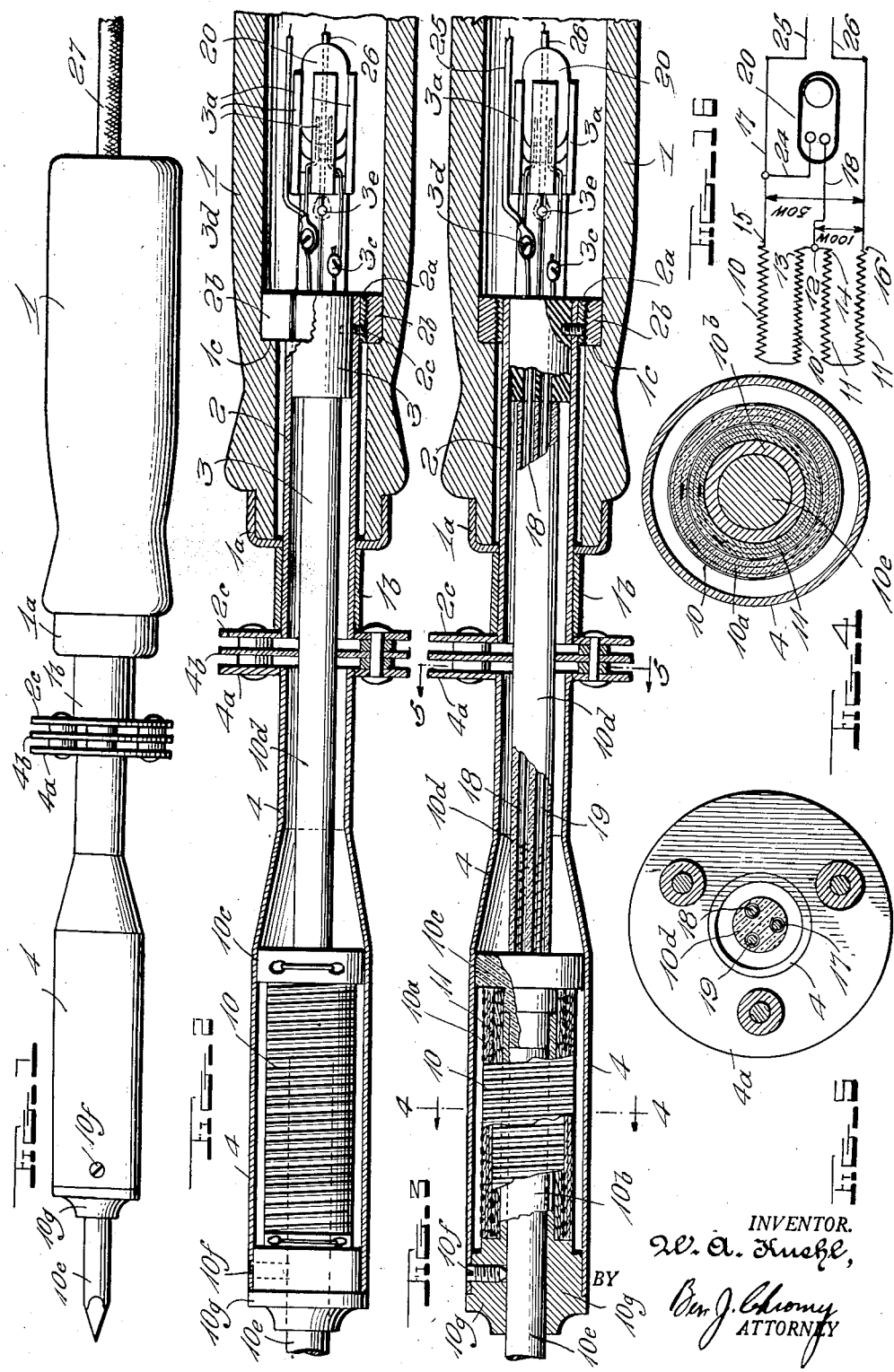

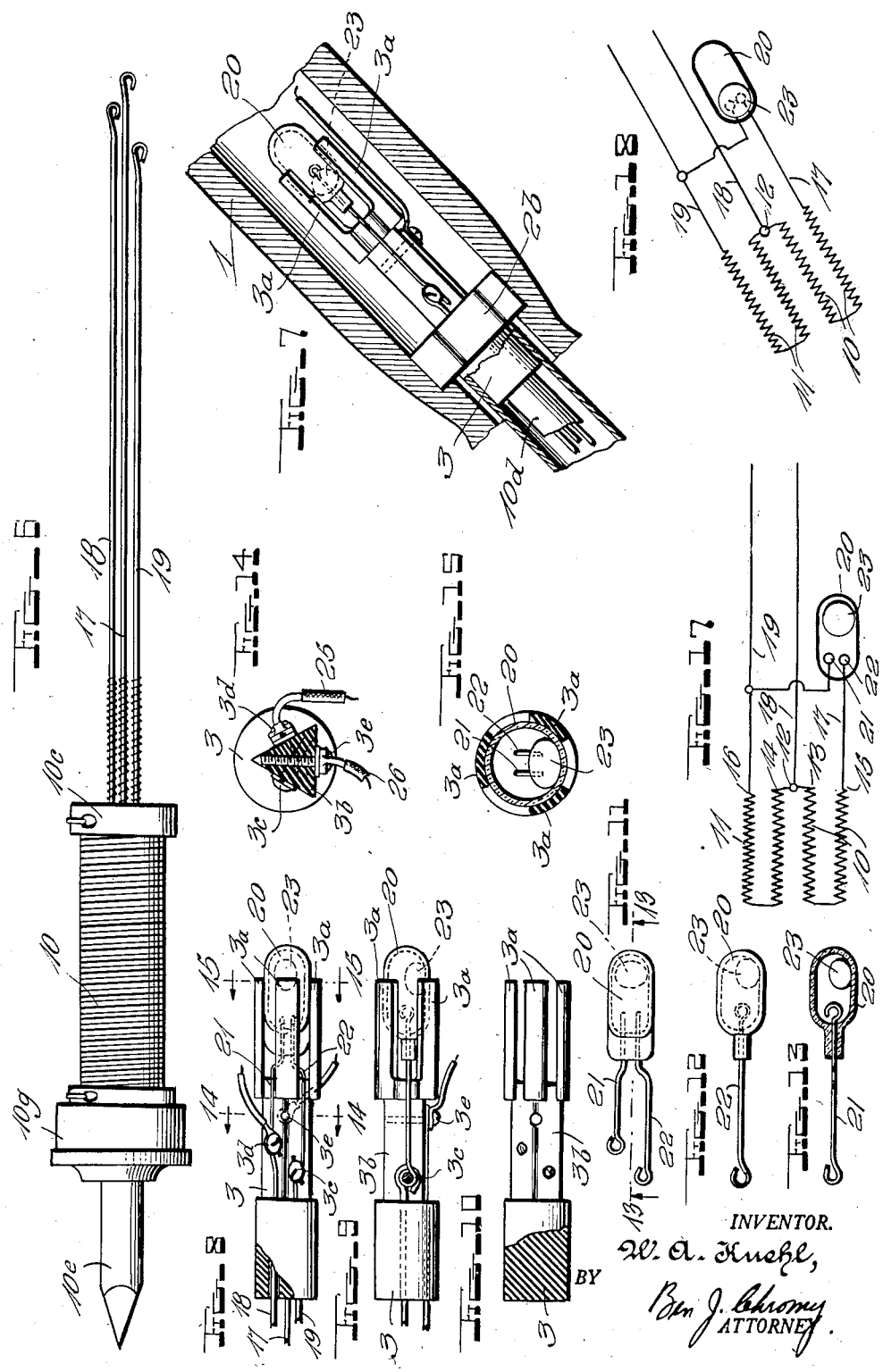

2,147,981

UNITED STATES PATENT OFFICE 2,147,981

PORTABLE ELECTRICALLY HEATED TOOL

Walter A. Kuehl, Chicago, Ill.

Application July 5, 1938, Serial No. 217,535

5 Claims. (Cl. 219—26)

This invention relates to electric soldering irons in general. More particularly this invention relates to an electric soldering iron having an idling heating rate and an increased heating rate when placed into use.

An object of this invention is to provide an electric soldering iron with automatic means for switching into use an auxiliary heating winding or for rearranging the electrical circuit of the soldering iron heating winding when the soldering iron is picked up and placed into use by the operator.

Another object of this invention is to provide an electric soldering iron with electric heating means whereby the heat produced when the soldering iron used is automatically increased over the heat produced when the iron is idling.

A further object of this invention is to provide an electric soldering iron with electric heating means and a mercury switch connected to said heating means for connecting an additional heating winding into the circuit of said heating means when the soldering iron is picked up by the operator for use.

Still another object of this invention is to provide a soldering iron with at least a pair of heating windings and a mercury switch connected to one or more of the windings to rearrange the heating circuit in the soldering iron when the iron is elevated into position for use, whereby the iron produces more heat during the interval of use.

Another object of this invention is to provide an electrically heated portable tool with a heater formed into a plurality of sections adapted to be connected to a source of current supply, one of said sections being adapted to be disconnected or short circuited by a gravity switch, such as, a mercury switch when the handle of the iron is grasped by the operator.

Other and further objects of this invention will be apparent to those skilled in the art to which it relates from the following specification and claims.

In accordance with this invention I provide a soldering iron that is adapted to get hotter automatically when it is picked up by the operator for use in soldering electrical connections and various other articles. The soldering iron of my invention is made to provide an iron that is economical to operate both from the standpoint of electricity consumed and from the standpoint of time required to perform the soldering operations. Furthermore the iron of my invention is just as easy to use as the conventional soldering iron because no push button switches must be manipulated or pressed during the soldering operation to connect additional heating windings into the heating circuit of the iron. Thus the operator's hand is not subjected to any additional fatigue while employing the iron of my invention.

The soldering iron disclosed herein consists of a pair of heating elements connected in series to the cord of the iron; these elements are of such a size that they heat the iron to a relatively high temperature, for example, sufficient to melt ordinary wire solder with which the iron may be used shortly after the cord is plugged or attached to a suitable source of current supply which may be the 110 volt lighting circuit. It is desirable that this temperature be high enough to enable the operator to perform a limited number of soldering operations.

The auxiliary heating winding connected in series with the main heating winding to the electric circuit is short circuited by means of a mercury type gravity switch as soon as the iron is elevated for use. This places the full heating load upon the main winding and the heat generated in this winding or heating section is accordingly increased to compensate for the heat radiated and otherwise dissipated from the iron tip into the solder and the work being soldered so that the temperature of the iron may be maintained even though soldering operations are carried on continuously.

The problem solved by the present soldering iron construction is not such as could be solved simply by making the heating capacity of a certain size iron larger because by doing this other problems would be introduced. For example, by making the iron of greater heating capacity the idling heat of the iron would become too great and would tend to shorten the life of the iron greatly as well as cause unnecessary corrosion of the soldering tip.

Various advantages and features of this invention will be apparent from the following specification and drawings in which briefly, Fig. 1 illustrates a side view of the electric soldering iron embodying this invention; Fig. 2 is a longitudinal sectional view showing some of the features of my invention; Fig. 3 is a sectional view similar to Fig. 2 showing additional features of my invention; Fig. 4 is a cross-sectional view showing the heating unit of the soldering iron; Fig. 5 is a cross-sectional view through the heat insulating baffle construction; Fig. 6 is an exterior side view of the heating element and leads thereto; Fig. 7 is a partial cross-sectional view of the handle shown for the purpose of illustrating the operation of the mercury switch; Figs. 8 to 10 inclusive are detail views illustrating the mercury switch support; Figs. 11 to 13 inclusive are views illustrating the mercury switch; Fig. 14 is a sectional view taken along the line 14—14 of Fig. 8; Fig. 15 is a sectional view taken along the line 15—15 of Fig. 8; Fig. 16 is a schematic diagram illustrating the circuit employed in an embodiment of my invention and Figs. 17 and 18 are schematic diagrams showing a circuit embodied in another arrangement of my invention.

Referring to Fig. 1 of the drawings in detail, reference numeral 1 designates a soldering iron handle of heat insulating material, for example, wood, "Bakelite", fiber, hard rubber and like. The handle is hollow and is provided with a hexagonal nut 2b in the inside thereof for receiving a threaded ring 2a that is closely fitted over an end of the tubular member 2. The threaded ring 2a may be dispensed and the end of the tube threaded instead. In this case the tube 2 is screwed into the nut 2b until this nut is drawn against the shoulder 1c formed in the inside of the handle. A set screw 2c is provided to a threaded hole which extends through the ring 2a and the tube 2. This set screw functions to hold the ring 2a in place upon the end of the tube 2 and also engages the insulation member 3 that serves as a mount for the mercury switch 20. The container of the mercury switch is held between the members 3a of the mount 3 and the mid portion 3b of this mount is provided with terminals for the purpose of connecting the switch into the desired electrical circuit as will be explained hereinafter.

A crown 1a is provided to the handle around the tube 2 and is held in place by the ring 1b which abuts against the flange of this crown and against the baffle plate 2c. A similar baffle plate 4a is attached to the tubular member 4 and this baffle plate together with the plate 2c and an intermediate plate 4b held in spaced relation by means of suitable small spacing washers and rivets constitute an efficient obstruction so that heat from the heating units housed in the casing 4 will be transmitted to the tube 2 and handle only to a very small degree so that heating of the handle will be practically not noticeable. In soldering irons of relatively small power consumption this baffle construction may be dispensed with and the tubes 2 and 4 made integral. The diameter of the portion of the tube 4 that houses the heating resistors 10 and 11 is made relatively large in order to receive these resistors which are wound into tubular shape and this tube is tapered down to a smaller size so that the portion attached to the baffle construction is substantially the same size as tube 2.

The heating resistors 10 and 11 consist of wire made of suitable material, such as, "nichrome", German silver, iron or the like formed into a flat ribbon or round wire wound into a multiple layer coil in which the layers are spaced by mica 10a or other suitable heat resistant insulation material. While I have illustrated the winding 10 as being placed over the winding 11 it is of course obvious that the winding 11 may be placed over the winding 10 or that these two windings may be wound side by side spaced from each other at the same time. The heating unit comprising these two windings is placed over the member 10b which is preferably of metal, such as, iron or the like and extends substantially through the heating unit up to a shoulder formed on the insulation member 10c which abuts against an end of the heating unit. The electrical connections to the heating unit are brought out through the insulation member 10c and wound over the wires 17, 18 and 19 extending through the insulation tube 10d which passes through the tubes 2 and 4 and extends into the handle up to the member 3. This tube 10d is provided with three holes as shown in Fig. 5 for receiving the wires 17, 18 and 19 and maintaining these wires in spaced relation. The members 10c and 10b are preferably made of some heat resistant insulation material, such as, porcelain or other ceramic material. The three holes formed in the tubular member 10d correspond to three holes formed in the member 3 so that the wires 17, 18 and 19 may be extended through the member 3 and attached to binding posts supported by the intermediate portion of the member 3.

The soldering iron tip 10e is made sufficiently long to extend well into the inside of the tubular member 10b and is held in place by the set screw 10f which is threaded into a hole formed in the portion 10g of the tubular member 10b. The portion 10g is fitted into the mouth of the heating element casing 4 and the single set screw 10f serves the purpose of holding the heating element support, the soldering iron tip and the heating element casing assembled. A new soldering tip may be inserted in place of the tip 10e whenever desired simply by loosening the set screw 10f and removing the old tip.

The insulation member 3 is provided with an intermediate portion 3b into which three holes are drilled and threaded for the purpose of receiving the three binding posts 3c, 3d and 3e to which the leads 17, 18 and 19 are attached so that the mercury switch 20 which is supported by the three arms 3a may be connected to the electrical circuit of the heating element. The flexible cord comprising the wires 25 and 26 and extending from the soldering iron handle as designated by the reference numeral 27 in Fig. 1, is also attached to the terminals carried by the insulation member 3. The aforesaid intermediate portion of the insulation member 3 is made triangular in shape as shown in Fig. 14, however, it is obvious that this intermediate portion may be left round although cutting this portion into triangular shape facilitates drilling the holes for the wires 17, 18 and 19 into this member. The end of the insulation member which carries the mercury switch 20 is formed with a cavity of sufficient size to receive the mercury switch container. It will be observed that this end of the insulation member is provided with three finger-like members 3a which engage the mercury switch container. The portions of the insulation material between these fingers was of course removed or cut away so that the mercury switch may be more readily inserted between these finger-like members and the connections to the electrodes of the switch may be more easily made. The mercury switch is held snugly between the arms 3a and where it is desired a piece of felt or other packing material may be placed between the switch container and these arms to absorb shock which might otherwise be imparted to the switch from rough handling of the soldering iron. In practice, however, I have found that the mercury switch mount illustrated is very satisfactory for all ordinary purposes.

The heating sections 10 and 11 of the heating unit may be connected either in series or in parallel and I have illustrated both types of connections in Figs. 16, 17 and 18. The circuit arrangement shown in Fig. 16 illustrates the resistance sections connected in series during periods when the iron is idling, that is, when the iron is connected to the electric circuit but is not being actually used for soldering connections or similar operations.

The end 13 of the resistance section 10 is connected by means of a wire 12 to the end 14 of the main heating section 11. These heating sections 10 and 11 may consist of various windings of electrical resistance wire suitable for use in portable electrically heated tools, as explained above, however, where it is desired the resistance heating unit may be made in the shape of a rod or bar out of suitable resistance material, such as, carbon, Carborundum, carbon particles mixed with or bonded together with suitable fillers or the like and these bar-shaped units may be encased in suitable metallic cases. These resistance sections 10 and 11 are made of such physical size and shape that they may be inserted as a unit into the casing of a soldering iron adjacent to the soldering iron tip as is described above.

When the soldering iron is connected to be electrically energized but is laying idle, that is, when the heating sections 10 and 11 are connected in series and the conductors 17 and 19 connected to points 15 and 16 of the sections 10 and 11, respectively, are connected to the 110 volt conductors 25 and 26 which form the soldering iron cord, the iron is adapted to be heated sufficiently to melt ordinary solder. The electrical resistances of sections 10 and 11 are such that sufficient heat is generated by the passage therethrough of electric current, when the sections are connected in series, that the soldering iron temperature may be sufficiently high to melt solders such as are used in the soldering of electrical connections, even when the soldering iron is in idling position. As soon as the electric iron is lifted or tilted by the operator to the position shown in Fig. 7 and applied to perform work, such as, soldering of electrical connections, the resistance section 10 of the heater is short-circuited through the operation of the mercury switch 20. This switch 20 is provided with two electrodes 21 and 22, supported by a suitable container usually of glass or similar material, which are adapted to be connected together by means of a small quantity of mercury 23, confined in the container, when the switch is tilted in the proper manner. Electrode 21 is connected to the point 13 of the heater section 10 by means of the conductors 12 and 18 while the electrode 22 is connected to the point 15 of the heater section 10 by the conductors 17 and 24. Thus when the circuit of the mercury switch 20 is closed the major portion of the heating current of the heater section 11 flows through the circuit of this section 11 by way of the conductors 18 and 24 attached to the mercury switch instead of through the auxiliary heating section 10. It is obvious that a greater heating current flows through the heater 11 when the auxiliary heater 10 is short-circuited by the switch 20 than when this switch 20 is open circuited. Furthermore the increase in current flow in the heater 11 by cutting the heater section 10 out of circuit may be made sufficient by selecting a resistance of the proper current carrying capacity, so that the soldering iron may be maintained hot enough to be used continually without interruptions heretofore necessitated by cooling of the soldering iron tip after a number of soldering operations.

Where it is desired the mercury switch 20 may be used to connect an additional heating section into the electrical heating circuit when the soldering iron is picked up for use, instead of short-circuiting one of the sections, and this type of circuit arrangement is illustrated in Figs. 17 and 18. This may be accomplished by connecting the switch 20 into the circuit of the conductor 17, joining the conductors 18 and 24 together, and connecting the point 15 of the heating section 10 to the point 16 of the heating section 11 through the switch 20. In this form of the invention the heating section 10 is adapted to be connected in parallel with the heating section 11 when the circuit of the switch 20 is closed, that is, when the iron is tilted as is schematically shown in Fig. 18. It is of course obvious that where the heater sections 10 and 11 are connected in parallel that the current carrying capacity and heat generating capacity must of necessity be changed from that which they were when the heating sections were connected in series. These capacities will also vary depending upon the sizes of the different irons employing features of this invention.

What I claim is:

1. A portable electrically heated tool adapted to automatically increase its heat when lifted for use, comprising: a heating element having a plurality of resistance sections, tubular means for housing said heating element, a hollow handle attached to an end of said tubular means, electrical connections extending through said handle and said tubular means to said heating element, a mercury switch including electrodes and mercury housed in a container, means for supporting said mercury switch in the hollow of said handle, said means including a holder having members for snugly receiving said mercury switch container therebetween and a stem of insulation material adapted to fit into the aforesaid end of said tubular means inside of said hollow handle, and connections for connecting said mercury switch to said heating element and a source of current supply whereby selected sections of said heating element may be energized when said switch is actuated.

2. A portable electrically heated tool adapted to automatically increase its heat when lifted for use, comprising: a heating element, tubular means for housing said heating element, a handle attached to said tubular means away from said heating element, a mercury switch positioned in a cavity formed in said handle, means for supporting said mercury switch in said handle cavity, said means including a stem of insulation material fitted into said tubular means in said handle and a finger shaped holder for snugly receiving said mercury switch therebetween, electrical terminals attached to said stem of insulation material, and connections for connecting selected ones of said terminals to said mercury switch, said heating element and to a source of current supply whereby the electric current consumed by said heating element is automatically increased when the tool is lifted in a predetermined manner for use.

3. A portable electrically heated tool adapted to automatically increase its heat when lifted for use, comprising: a heating element, tubular means for housing said heating element in a portion thereof, a hollow handle extending over and substantially concentric with at least a portion of said tubular means, said tubular means having a member abutting against an end of said handle, a shoulder formed inside of said hollow handle, means inside of said hollow handle engaging said tubular means for abutting against said shoulder and clamping said handle against said abutting member of said tubular means, an automatic switch of the gravity actuated type positioned in said hollow handle, an insulation support positioned inside of said hollow handle, said support having a plurality of projecting members for receiving and clamping said switch therebetween in normally open circuit position whereby said switch may be closed when the tool is tilted for use, electrical terminals on said insulation support and connections connected to said switch and said heating element for connecting said electrical terminals to a source of current supply.

4. A portable electrically heated tool adapted to automatically increase its heat when lifted for use, comprising: a heating element, tubular means for holding said heating element, a hollow handle attached to said tubular means away from said heating element, said tubular means having a member abutting against an end of said handle, a shoulder formed inside of said hollow handle, means inside of said hollow handle engaging said tubular means and abutting against said shoulder for clamping said handle against said abutting member of said tubular means, a mercury switch positioned in a cavity formed in said handle, a plurality of finger-like members for frictionally engaging and for supporting said mercury switch in said cavity so that the circuit of said switch is open when the handle is in a horizontal position, connections for connecting said mercury switch to said heating element and a source of current supply so that the current consumed by said heating element is automatically increased when the circuit through said mercury switch is closed by picking up the tool and tilting for use.

5. A portable electrically heated tool, comprising: a heating element, tubular means for housing said heating element, a hollow handle extending over and substantially concentric with a portion of said tubular means, a mercury switch connected to said heating element and to a source of current supply, an elongated rod-like member having a portion fitting into said tubular means and a portion extending from said tubular means well into the hollow of said handle, said elongated rod-like member having finger-like members for snugly engaging said mercury switch for supporting said mercury switch in said hollow handle substantially in line with the axes of said handle and the co-extensive portion of said tubular means, said rod-like member and said mercury switch being of a diameter small enough to be inserted into said hollow handle assembled with said tubular means, and a threaded member inside of said hollow handle for receiving and holding said tubular means.

WALTER A. KUEHL.